United States Patent
Nagata

(10) Patent No.: US 9,516,543 B2
(45) Date of Patent: Dec. 6, 2016

(54) CONGESTION CONTROL METHOD AND WIRELESS COMMUNICATION EQUIPMENT

(71) Applicant: FUJITSU LIMITED, Kawasaki (JP)

(72) Inventor: Nami Nagata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 205 days.

(21) Appl. No.: 14/012,432

(22) Filed: Aug. 28, 2013

(65) Prior Publication Data
US 2013/0343195 A1    Dec. 26, 2013

Related U.S. Application Data

(63) Continuation of application No. PCT/JP2011/056667, filed on Mar. 19, 2011.

(51) Int. Cl.
| | |
|---|---|
| *H04W 28/02* | (2009.01) |
| *H04L 12/801* | (2013.01) |
| *H04W 28/18* | (2009.01) |
| *H04W 84/18* | (2009.01) |
| *H04W 24/00* | (2009.01) |
| *H04W 84/04* | (2009.01) |
| *H04W 84/12* | (2009.01) |

(52) U.S. Cl.
CPC .......... *H04W 28/0278* (2013.01); *H04L 47/11* (2013.01); *H04W 28/0284* (2013.01); *H04W 24/00* (2013.01); *H04W 28/18* (2013.01); *H04W 84/047* (2013.01); *H04W 84/12* (2013.01); *H04W 84/18* (2013.01)

(58) Field of Classification Search
CPC ............... H04W 84/18; H04W 28/18; H04W 74/0875; H04L 47/10; H04L 12/413; H04L 12/5693; H04L 12/5695; H04L 1/0007; H04L 1/1887; H04L 41/5022; H04L 43/026; H04L 45/125
See application file for complete search history.

(56) References Cited

U.S. PATENT DOCUMENTS

| | | | |
|---|---|---|---|
| 2002/0176406 A1* | 11/2002 | Tsukada | H04L 65/1009 370/352 |
| 2006/0056382 A1* | 3/2006 | Yamada et al. | 370/349 |

(Continued)

FOREIGN PATENT DOCUMENTS

| | | |
|---|---|---|
| JP | 2006-101477 | 4/2006 |
| JP | 2007-243952 | 9/2007 |

(Continued)

OTHER PUBLICATIONS

PCT International Preliminary Report on Patentability mailed Oct. 3, 2013 in corresponding International Application No. PCT/JP2011/056667.
International Search Report mailed Jun. 14, 2011 in corresponding International Application No. PCT/JP2011/056667.

(Continued)

*Primary Examiner* — Un C Cho
*Assistant Examiner* — Oussama Roudani
(74) *Attorney, Agent, or Firm* — Staas & Halsey LLP

(57) ABSTRACT

A congestion control method is used in a wireless network that includes a plurality of wireless communication equipments. The method includes: monitoring a congestion condition in respective wireless communication equipments; and extending an exclusive transmission time in which a packet is transmitted exclusively using wireless resource of the wireless network in a congested wireless communication equipment in which congestion has occurred among the plurality of wireless communication equipments.

11 Claims, 13 Drawing Sheets

(56) References Cited

U.S. PATENT DOCUMENTS

| | | | |
|---|---|---|---|
| 2007/0025289 A1* | 2/2007 | Nandagopalan | H04W 72/1236 370/329 |
| 2007/0206639 A1 | 9/2007 | Zhao et al. | |
| 2007/0214379 A1 | 9/2007 | Abraham et al. | |
| 2008/0232339 A1* | 9/2008 | Yang | H04W 72/1215 370/342 |
| 2010/0182925 A1 | 7/2010 | Nagata et al. | |

FOREIGN PATENT DOCUMENTS

| | | |
|---|---|---|
| JP | 2009-529302 | 8/2009 |
| JP | 2010-171525 | 8/2010 |

OTHER PUBLICATIONS

Japanese Office Action mailed Aug. 5, 2014 in corresponding Japanese Patent Application No. 2013-505672.

* cited by examiner

RELATED ART

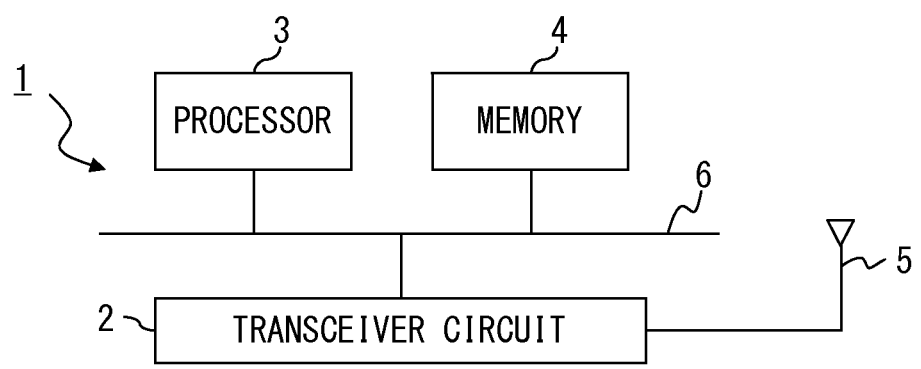
F I G. 3

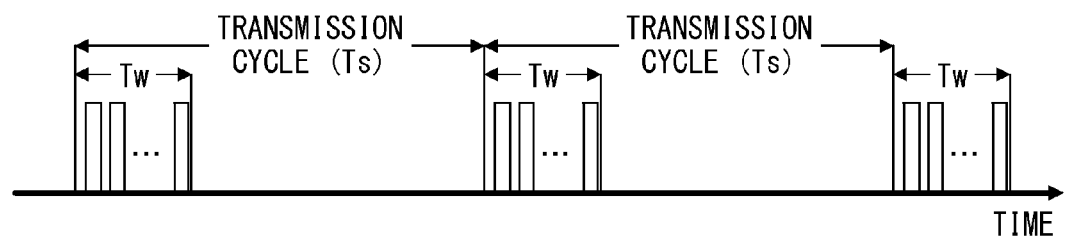
F I G. 5

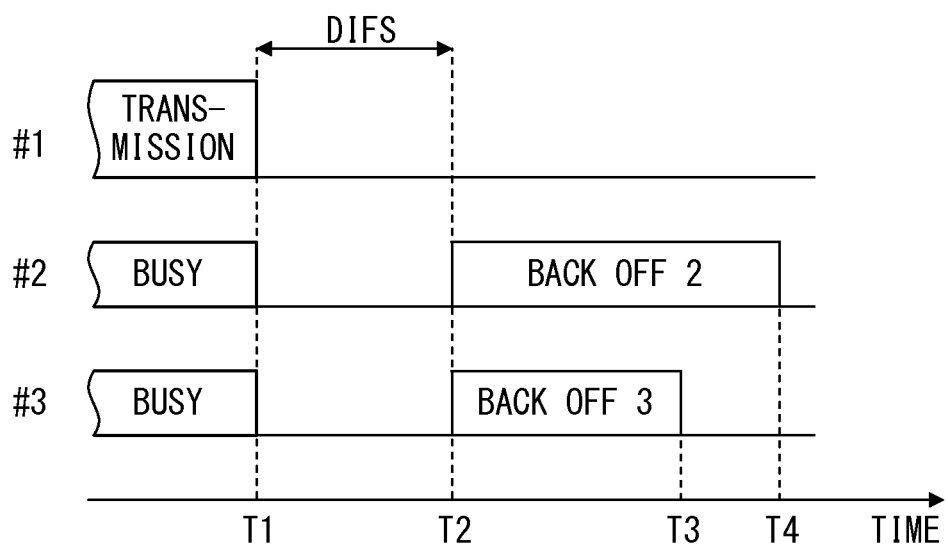
F I G. 6

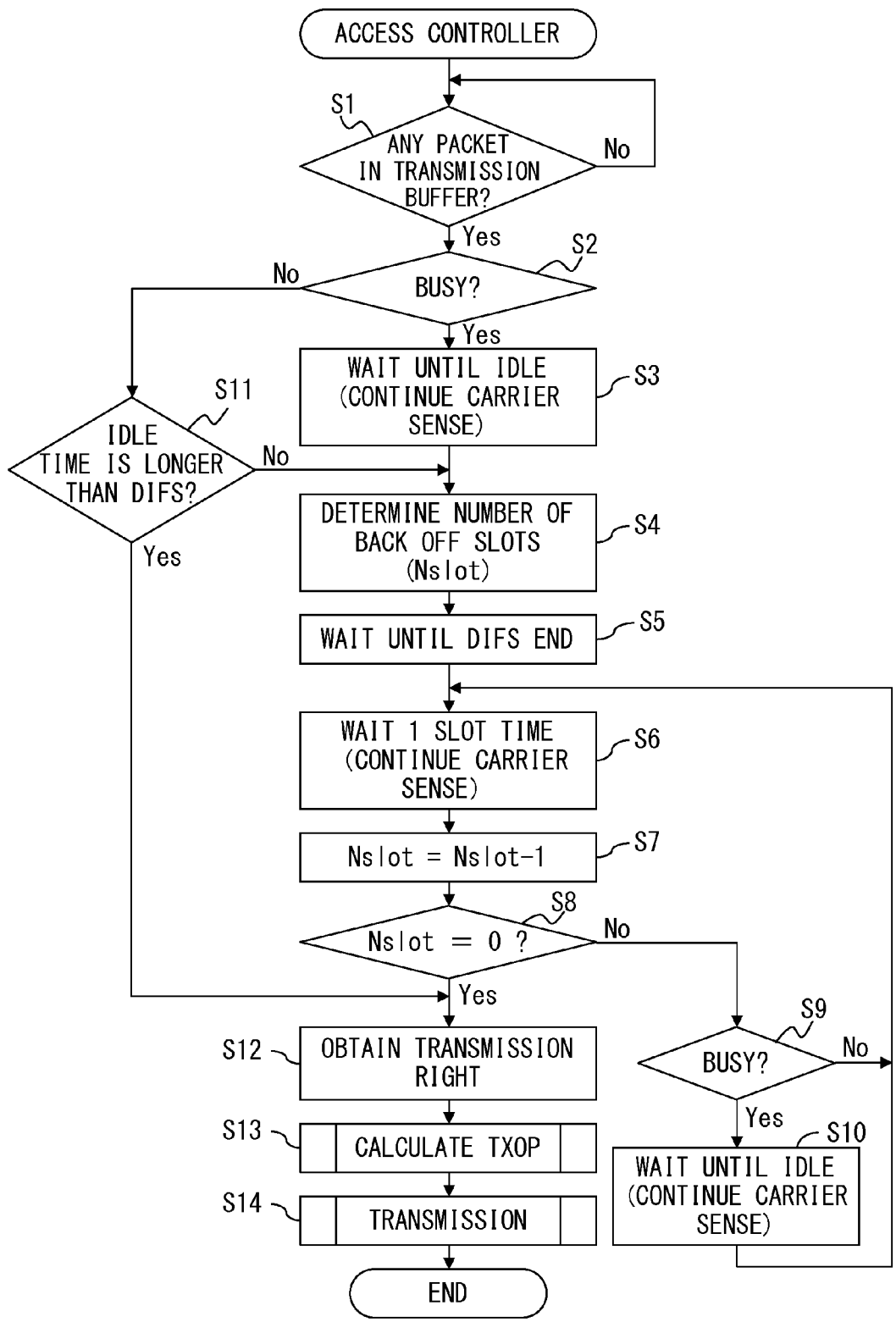
F I G. 7

TXOP(ALL) = $t_0$

TXOP(A) = $t_0$ + FL
TXOP(OTHER) = $t_0$

TXOP(A) = $t_0$ + FL
TXOP(B) = $t_0$ + FL
TXOP(OTHER) = $t_0$

TXOP(A) = $t_0$ + 2FL
TXOP(B) = $t_0$ + FL
TXOP(OTHER) = $t_0$

TXOP(A) = $t_0$ + 2FL
TXOP(B) = $t_0$ + FL
TXOP(C) = $t_0$ + FL
TXOP(OTHER) = $t_0$

TXOP(A) = $t_0$ + 3FL
TXOP(B) = $t_0$ + FL
TXOP(C) = $t_0$ + FL
TXOP(OTHER) = $t_0$

F I G. 1 3 A
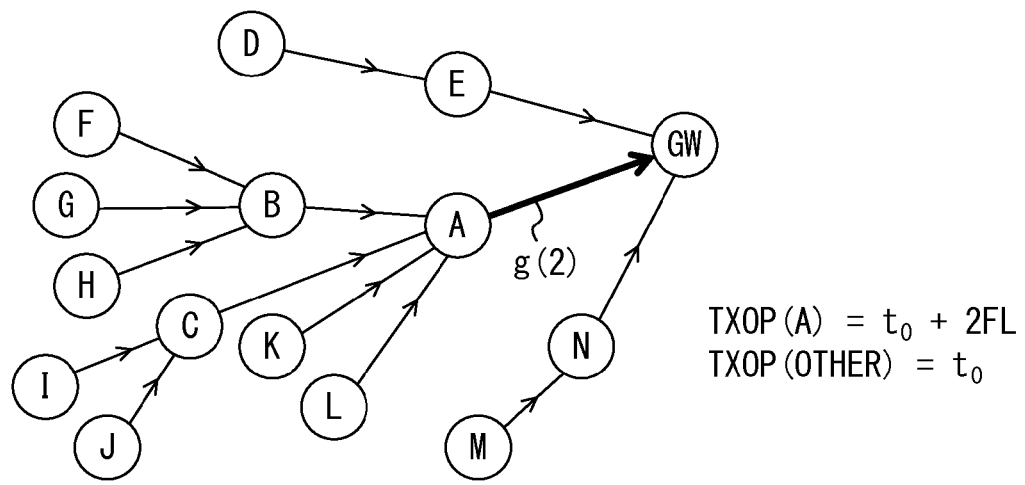
TXOP(A) = $t_0$ + 2FL
TXOP(OTHER) = $t_0$
F I G. 1 3 B
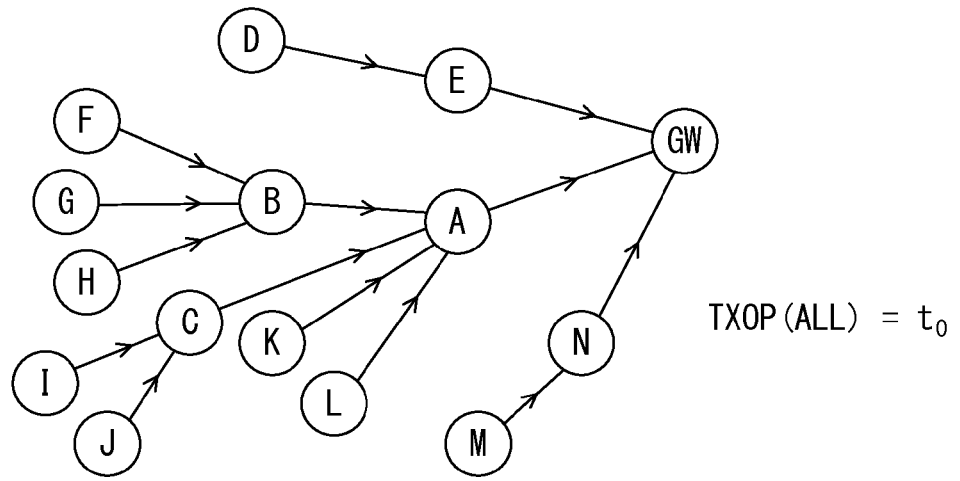
TXOP(ALL) = $t_0$

CONGESTION CONTROL METHOD AND WIRELESS COMMUNICATION EQUIPMENT

CROSS-REFERENCE TO RELATED APPLICATIONS

This application is a continuation application of International Application PCT/JP2011/056667 filed on Mar. 19, 2011 and designated the U.S., the entire contents of which are incorporated herein by reference.

FIELD

The embodiments discussed herein are related to a congestion control method in a wireless multi-hop network and wireless communication equipment.

BACKGROUND

As a form of network including a plurality of nodes, an ad hoc network has been put into practical use. In the ad hoc network, path selection is performed autonomously in each node. That is, each node equipment (or, a communication equipment) of the ad hoc network has a function to operate as a router or a switch. Here, each node equipment is capable of recognizing the network configuration in the surrounding by transmitting and receiving a message and the like with adjacent node equipments. Therefore, by adopting the ad hoc (especially the wireless ad hoc) system, only by implementing node equipments in the environment in which establishment of the network is desired, the desired network may be established, without providing a management equipment to manage the entire network. Furthermore, in the ad hoc network, addition or deletion of a node is easy, making it possible to easily change the network configuration.

As an embodiment of the ad hoc network, a wireless multi-hip network having a tree structure topology has been known, where data is transmitted from each node to a certain node (for example, a gateway node or a root node). For example, a sensor network has been put into practical use where a gateway node equipment collects information detected at each node. As an access scheme of the wireless link, an autonomous distributed access scheme is adopted in many cases. For example, in wireless LAN and ZigBee, CSMA/CA (Carrier Sense Multiple Access with Collision Avoidance) is adopted. In this scheme, transmission opportunities are equally assigned to the respective nodes, and the respective node equipments can regularly transmit a packet.

As a related art, a configuration and method for improving the throughput of the entire system by preventing the buffer overflow due to data packet congestion in the wireless communication equipment that is a relay node in the wireless ad hoc network system. (For example, Japanese Laid-open Patent Publication No. 2006-101477)

In the wireless multi-hop network, when each node equipment autonomously transmits a packet, congestion may occur in a relay node for example. Especially in the wireless multi-hop network where data is transmitted from each node to the gateway node, congestion may occur in the vicinity of the gateway (hereinafter, gateway may be referred to as GW).

For example, in the wireless multi-hop network illustrated in FIG. 1A, it is assumed that each of node equipments A-G regularly transmits a packet to the GW node. In the example illustrated in FIG. 1A, in a transmission cycle, the node equipments A-G respectively generate and transmit packets A-G. Meanwhile, it is assumed that each node equipment transmits a packet to an adjacent node on the path towards the final destination node (that is, the GW node). For example, the node equipment C transmits the packet C to the node A in a certain transmission cycle. Then, the node equipment A stores the packet C received from the node C in the transmission buffer, and forwards the packet C to the node E in another transmission cycle. Further, the node equipment E stores the packet C received from the node A in the transmission buffer, and forwards the packet C to yet another transmission cycle. In this way, the packet transmitted from each node is forwarded to the final destination node.

However, in the configuration where each node autonomously transmits a packet, there is a possibility that congestion occurs in one or a plurality of relay nodes. In the example illustrated in FIG. 1A, in a certain transmission cycle, the node equipments B, C, D respectively transmit the packets B, C, D to the node A. Then, as illustrated in FIG. 1B, the packets B, C, D are stored in the transmission buffer of the node A. In a similar manner, in the transmission buffer of the node equipment E, the packets A, F transmitted respectively from the node A, F are stored. In addition, in the transmission buffer of the node equipment F, the packet G transmitted from the node G is stored. After that, if each node equipment respectively generate and transmit a new packet regularly, there is a risk that overflow occurs in the transmission buffers of the nodes A, E, F (especially the node A). This is because, while the transmission opportunity obtained in CSMA/CA is equal to each node, the number of packets to be transmitted (that is, the number of received packets) is larger in anode where more paths concentrate. That is, when the nodes A-D respectively obtains one transmission opportunity in a transmission cycle, while the node A is capable of transmitting one packet (packet A), the node A receives packets B-D at the same time. A similar operation is repeated in the subsequent cycles. For this reason, in the transmission buffer of the node A, three packets are added in each transmission cycle.

This problem may be solved, for example, by the node equipment where congestion has occurred sending a notification of a message to make a request to the transmission source node for a reduction in the transmission rate. However, in this method, there is a need to transmit a packet to send a notification of the message, and this packet is also stored in the transmission buffer, which may deteriorate the congestion condition.

In addition, when the network topology is known, the problem above may be solved by setting the transmission rate or the transmission bandwidth of the node equipment that is susceptible to the occurrence of congestion higher compared with other node equipments. However, in the wireless multi-hop network, the radio wave condition is not constant, and there may be a change in the wireless link between nodes. In this case, the network topology changes, and accordingly, the node that is susceptible to congestion also changed. In addition, even in a case in which the topology (forwarding path) does not change, the number of packets that each node forwards may change in some cases. In this case, assuming that a transmission rate is fixedly assigned to a node where the paths concentrate, when there are no or a small number of packets transmitted from the node and nodes under the node, unnecessary resources are assigned. Then, the transmission opportunity of other nodes is reduced, and may decrease the throughput of the entire network.

SUMMARY

According to an aspect of the embodiments, a congestion control method is used in a wireless network that includes a plurality of wireless communication equipments. The method includes: monitoring a congestion condition in respective wireless communication equipments; and extending an exclusive transmission time in which a packet is transmitted exclusively using wireless resource of the wireless network in a congested wireless communication equipment in which congestion has occurred among the plurality of wireless communication equipments.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates the configuration of a node equipment.

FIG. 5 is a diagram illustrating the flow control of a wireless network according to the embodiment.

FIG. 6 illustrates a control method for avoiding packet collision.

FIG. 7 is a flowchart illustrating the process of an access controller.

FIG. 11A-FIG. 11C, FIG. 12A-FIG. 12C, FIG. 13A, FIG. 13B illustrate an example of a congestion control method according to the embodiment.

DESCRIPTION OF EMBODIMENTS

Figure 1A:
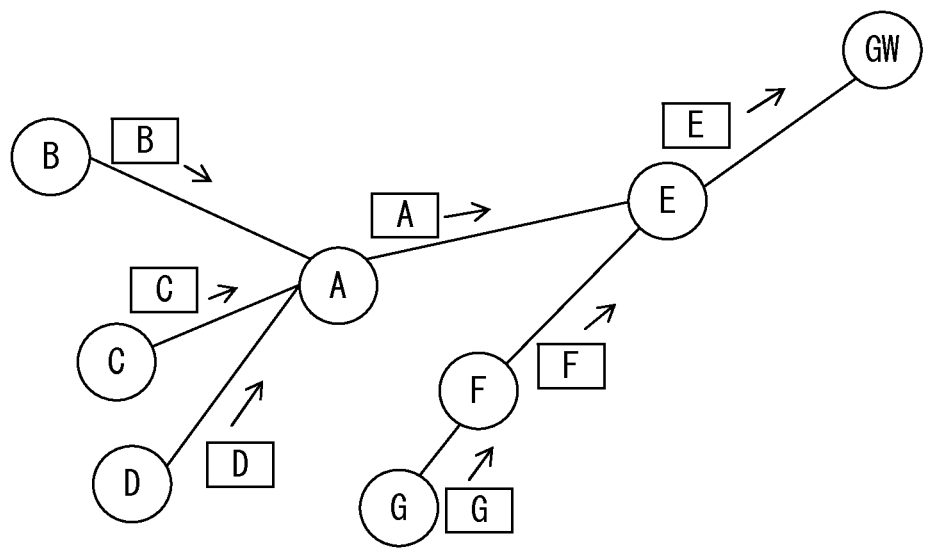
FIG. 1A and FIG. 1B illustrate the packet transmission and congestion of a relay node in a wireless multi-hop network.
Figure 1B:
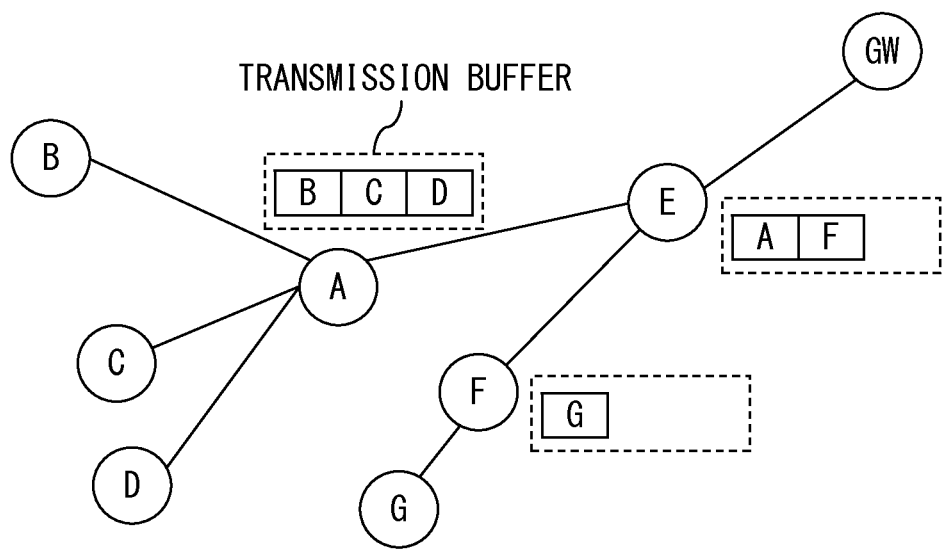
Figure 2A:
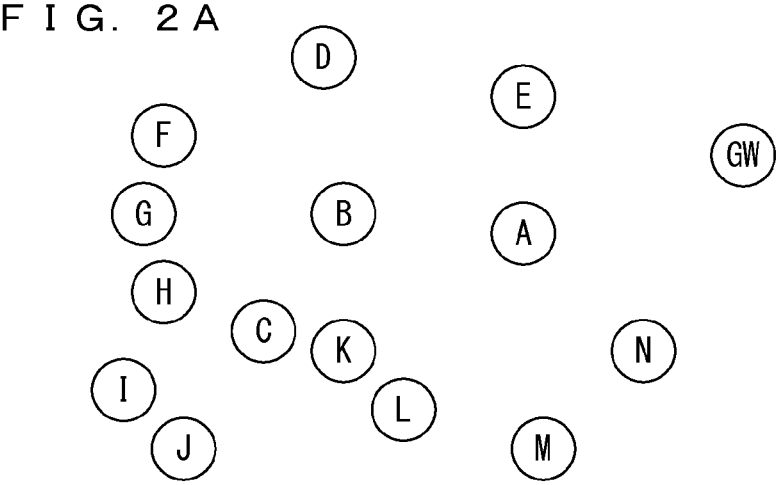
FIG. 2A-FIG. 2C illustrate an example of a wireless multi-hop network in which a congestion control method according to an embodiment is used.
Figure 2B:
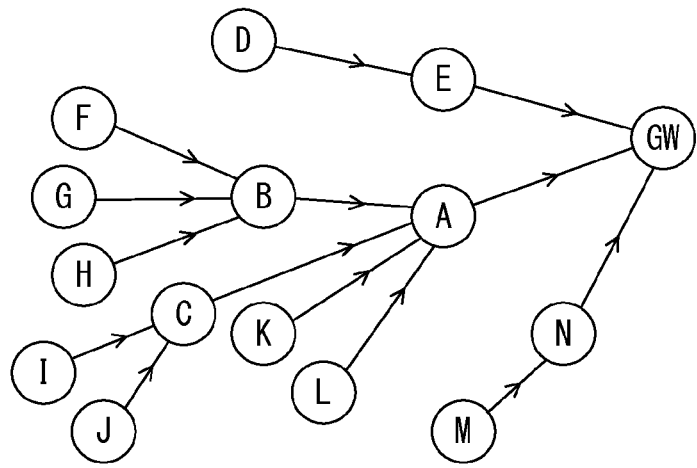
Figure 2C:
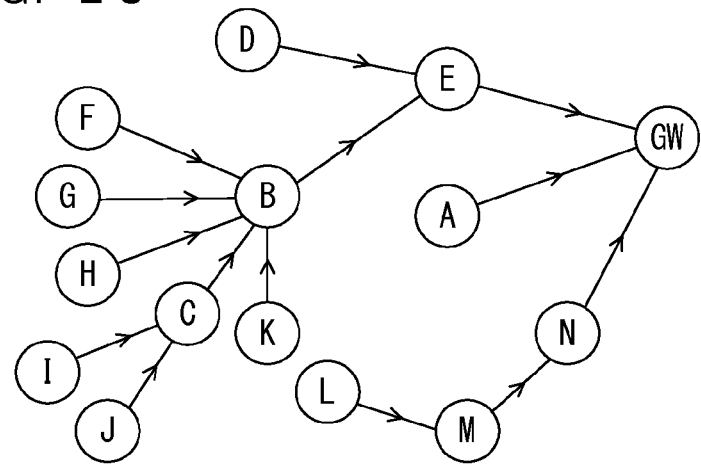

FIG. 2A-FIG. 2C illustrate an example of a wireless network in which a congestion control method according to an embodiment is used. In this example, the wireless network includes, as illustrated in FIG. 2A, nodes A-N, and GW. In each of the nodes A-N, and GW, a wireless communication equipment is implemented. In the explanation below, the wireless communication equipment implemented in each node may be referred to as a "node equipment". That is, in the nodes A-N, and GW, node equipments A-N, GW are implemented respectively.

The node equipment GW is, for example, connected to a server computer. Alternatively, the node equipment GW is connected to an external network. In this example, the node equipment GW collects information from the respective nodes A-N. That is, the nodes A-N respectively transmit a data packet to the node equipment GW.

For example, the respective node equipments regularly monitor the communication quality with an adjacent node, and update a routing table according to the monitoring result. The routing table provided in the respective node equipments stores information related to the optimal path with respect to one or a plurality of final destination nodes. In this example, in the routing table of the respective node equipments A-N, information related to the optimal path to the node GW is stored. The "information related to the optimal path" includes information to identify an adjacent node located on the optimal path. For example, in the example illustrated in FIG. 2B, in the routing table of the node equipment B, "adjacent destination: A" is registered with respect to "final destination: GW". In addition, in the routing table of the node equipment D, "adjacent destination: E" is registered with respect to "final destination: GW".

To the header of a data packet transmitted from each node, the final destination identifier to identify the final destination node is assigned. The respective node equipments refer to the routing table using the final destination identifier of the received data packet, and identify the adjacent destination node. For example, when the final destination identifier "GW" is assigned to a data packet received from the node F, the node equipment B forwards the data packet to the node A according to the routing table. Meanwhile, when transmitting a data packet generated by a node equipment itself, the node equipment also transmits the data packet to the adjacent node registered in the routing table.

As described above, in the wireless network according to the embodiment, the respective node equipments autonomously decide the path of the packet. The data packet is forwarded to the final destination with the respective node equipments performing the routing operation described above. That is, the wireless network of the embodiment may be a multi-hop network.

However, in a wireless network, the wireless environment between nodes may change. When the wireless environment changes, the network topology may change. For example, in the wireless network illustrated in FIG. 2B, it is assumed that the wireless environment around the node A deteriorates. At this time, for example, the node equipment B changes the adjacent destination node for transmitting the data packet to the node equipment GW from "A" to "E". In a similar manner, the node equipments C, K, L also change the adjacent destination nodes for transmitting the data packet to the node equipment GW. In this case, the network topology for transmitting data packet to the node equipment GW is configured as illustrated in FIG. 2C. Meanwhile, the network topology also changes due to other factors (for example, addition or deletion of a node).

FIG. 3 illustrates the configuration of the node equipment. A node equipment 1 of the embodiment includes, as illustrated in FIG. 3, a transceiver circuit 2, a processor 3, a memory 4, and an antenna 5. The transceiver circuit 2 includes a wireless interface, and terminates the packet received via the antenna 5. In addition, the transceiver circuit 2 transmits a packet via the antenna 5 according to an instruction from the processor 3. The processor 3 may provide the following function by executing a program stored in the memory 4. That is, the processor 3 may generate a packet that stores transmission data by executing an application program. In addition, the processor 3 is capable of executing a process according to the data stored in a received packet. Furthermore, the processor 3 is capable of a process related to packet transmission.

The memory 4 includes a ROM area and a RAM area. The ROM area may store the program executed by the processor 3. The RAM area may be used as a working area of the processor 3. In addition, the RAM area may also be used as a transmission buffer to temporarily store a transmission packet. Meanwhile, the transceiver circuit 2, the processor 3, the memory 4 are connected to each other, for example, by a bus 6.

Figure 4:
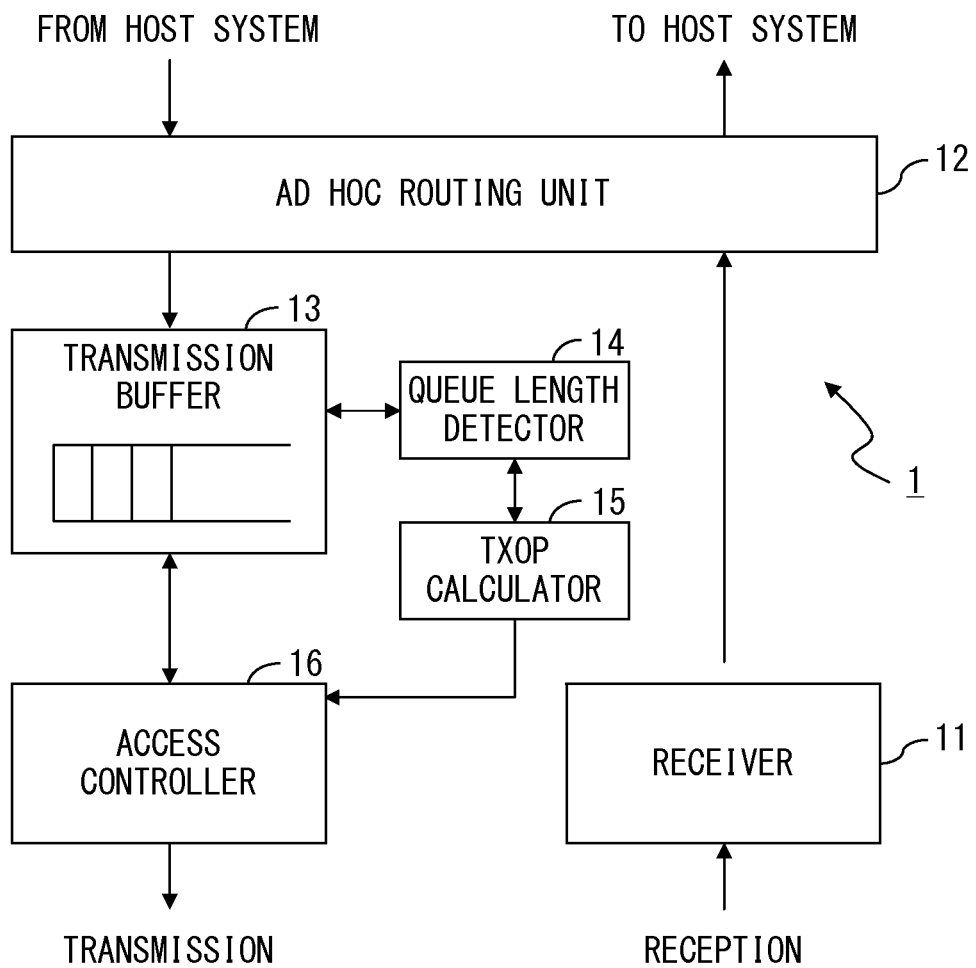
FIG. 4 is a diagram illustrating the function of a node equipment.

FIG. 4 illustrates the function of the node equipment. The node equipment 1 includes a receiver 11, an ad hoc routing unit 12, transmission buffer 13, a transmission queue length detector 14, a TXOP calculator 15, and an access controller 16. The receiver 11 forwards the received packet to the ad hoc routing unit 12.

The ad hoc routing unit 12 refers to the destination address assigned to the header of the received packet, and decides the process for the received packet. That is, when the destination address of the received packet indicates the node equipment (the node equipment in which the ad hoc routing unit 12 is operating) 1, the ad hoc routing unit 12 forwards the received packet to a host system processor that is not illustrated in the drawing. The host system processor includes, while there is no particular limitation, application software, for example. When the destination address of the received packet indicates another node, the ad hoc routing unit 12 writes the packet into the transmission buffer 13, after updating the header information as needed. At this time, the ad hoc routing unit 12 refers to the routing table, and for example, updates the adjacent destination in the header of the packet based on the final destination of the packet.

The host system processor is capable of generating a transmission packet. In the wireless network illustrated in FIG. 2A-FIG. 2C, the host system processor of the respective node equipments regularly generate a packet that stores data to be transmitted to the node GW. The packet generated by the host system processor is written into the transmission buffer 13 by the ad hoc routing unit 12.

The transmission buffer 13 temporarily stores the generated packet and the forwarded packet. The generated packet is generated, as described above, by the host system processor. The forwarded packet is a received packet whose destination is another node. That is, the transmission buffer 13 stores a packet that the node equipment 1 transmits (that is, the transmission packet). Note that the transmission buffer 13 is realizes by a FIFO memory, for example.

The transmission queue length detector 14 detects the length of the transmission queue of the transmission buffer 13. When the frame length of each transmission packet is the same, the transmission queue length detector 14 may calculate the transmission queue length based on the number of transmission packets stored in the transmission buffer 13. In this case, the transmission queue length detector 14 may be realized by a counter that is incremented every time when a packet is written into the transmission buffer 13, and decremented every time when a packet is read out from the transmission buffer 13, for example.

The transmission queue length detected by the transmission queue length detector 14 is used in the TXOP calculator 15 for deciding whether or not the node equipment is in the congestion condition. That is, the transmission queue length detector 14 is an example of a congestion condition monitor that monitors the congestion condition of the node equipment (the node equipment in which the transmission queue length detector 14 is operating).

The TXOP calculator 15 is called by the access controller 16, and calculates the TXOP (Transmission Opportunity) based on the congestion condition of the node equipment 1. The congestion condition of the node equipment 1 is represented by the transmission queue length detected by the transmission queue length detector 14. In addition, TXOP represents the period of time in which the packet can be transmitted exclusively using the resource of the wireless network. That is, the TXOP calculator 15 is an example of a calculator that calculates the exclusive transmission time. Meanwhile, the operation of the TXOP calculator 15 is described in detail later with reference to a flowchart.

Upon obtaining transmission right of the wireless network, the access controller 16 reads out a packet from the transmission buffer 13 and transmits the packet to the destination node. In this example, the access controller 16 obtains the transmission right in the CSMA/CA: Carrier Sense Multiple Access with Collision Avoidance scheme and transmits the packet. In addition, the access controller 16 transmits the packet within the period of TXOP set by the TXOP calculator 16. Meanwhile, the operation of the access controller 16 is described in detail later with reference to a flowchart.

FIG. 5 illustrates the flow control of the wireless network according to the embodiment. In this example, the respective node equipments transmit the packet in a transmission cycle Ts specified in advance. At this time, for example, the respective node equipments generate one packet per transmission cycle Ts and transmit the packet to the node equipment GW. Meanwhile, the respective node equipments are respectively provided with a clock. In addition, the clocks of the respective node equipments are synchronized with each other.

However, when all of the node equipments transmit packets at the same time, the network gets congested. For this reason, each node equipment starts the transmission process at a different timing in a transmission window Tw specified in advance. Meanwhile, the transmission window Tw may be determined according to the number of nodes in the network and the like.

FIG. 6 illustrates a control method for avoiding packet collision. Here, it is assumed that the wireless network includes three node equipments #1-#3. In addition, in this embodiment, the wireless network adopts the CSMA/CA.

In CSMA/CA, a back off is assigned to each node equipment. The back off represents a waiting time or a delay time from when the resource of the wireless network is released until the node equipment obtains the transmission right. Here, the back off is generated, for example, in each node equipment respectively using a random number. Therefore, the back off assigned to respective node equipments are different from each other in many cases. In an example illustrated in FIG. 6, the back offs 2, 3 respectively assigned to the nodes #2, #3 are different from each other.

In FIG. 6, before the time T1, the node equipment #1 transmits the packet. For this reason, before the time T1, the wireless resource is in the busy state. Therefore, the node equipments #2, #3 are not able to obtain transmission right before the time T1. Note that each node equipment performs carrier sense (sensing of the carrier radio wave power) constantly.

At the time T1, the packet transmission by the node equipment #1 finishes. Then, each node equipment detects the end of the busy state (that is, the release of the wireless resource), based on the result of the carrier sense. Meanwhile, in FIG. 6, to simplify the explanation, an ACK packet sent back in response to the data packet is omitted.

Each node equipment waits for a specified period of time, from when the busy state ends. This period corresponds to, for example, DIFS: Distributed Inter Frame Space defined in IEEE802.11, while there is no particular limitation. In the description below, this period is referred to as DIFS. However, this period is not limited to DIFS of IEEE802.11.

Each node equipment counts the corresponding back off time since when DIFS ends. That is, each node equipment counts the corresponding back off time from time T2. In the example illustrated in FIG. 6, the node equipment #2 counts the back off 2 from time T2. In a similar manner, the node equipment #3 counts the back off 3 from time T2.

When the count of the corresponding back off time ends, each node equipment is able to obtain the transmission right. That is, the node equipment #2 is able to obtain the transmission right after time T4. Similarly, the node equipment #3 is able to obtain the transmission right after time T3. However, when a node equipment obtains the transmission right, the transmission right is not granted to other node equipments. For example, when the node equipment #3 obtains the transmission right and starts packet transmission, after that, the wireless network enters the busy state, and the node equipment #2 is not able to obtain the transmission right.

As described above, the wireless network of the embodiment controls the transmission right of each node equipment using the back off of CSMA/CA. Here, the back off time of respective node equipments are generated using random number and the like and are different from each other in many cases. Therefore, the wireless network of the embodiment can avoid or suppress packet collision.

The node equipment that has obtained the transmission right as described above is able to transmit a packet using the wireless resource exclusively. That is, the node equipment that has obtained the transmission right is able to transmit a packet temporarily occupying the wireless resource. The exclusive transmission time in which the node equipment that has obtained the transmission right is able to occupy the wireless resource is determined, in this embodiment, according to the congestion condition of the node equipment.

The exclusive transmission time of the node equipment in which congestion has not occurred corresponds to a period of time required for transmitting one packet (or, frame), for example. However, this exclusive transmission time may also be configured to correspond to a period of time required for transmitting two or more packets.

The exclusive transmission time of the node equipment in the congestion condition is set to be longer than that of the node equipment in which congestion has not been occurred. In the node equipment in the congestion condition, the exclusive transmission time is determined so that a plurality of packets may be transmitted consecutively. Therefore, upon obtaining the transmission right, the node equipment in the congestion condition is able to transmit a plurality of packets stored in the transmission buffer in one transmission cycle. As a result, the congestion condition of the node equipment is resolved or eased. Note that "transmitted consecutively" means that packet transmission is not performed by other node equipments, and does not necessarily means that the transmission interval of packets is zero.

The exclusive transmission time corresponds to, in IEEE802.11e, TXOP (Transmission Opportunity). Therefore, in the explanation below, the exclusive transmission time described above is referred to as TXOP.

FIG. 7 is a flowchart illustrating the process of the access controller 16. This process is executed respectively by the access controller 16 implemented in each node equipment. In addition, this process is executed repeatedly, in the period in which the node equipment is operating.

In step S1, the access controller 16 decides whether or not any packet is stored in the transmission buffer 13. When no packet is stored in the transmission buffer 13, the access controller 16 continues the process of step S1.

In step S2, the access controller 16 decides whether or not the resource of the wireless network is in the busy state, by carrier sense. When the carrier radio wave power is higher than or equal to a specified threshold, it is decided that the wireless resource is in the busy state. On the other hand, when the carrier radio wave power is lower than the threshold, it is decided that the wireless resource is in the idle state.

When the wireless resource is in the busy state, the access controller 16 waits until the idle condition is detected in step S3. At this time, the access controller 16 continues carrier sense.

In step S4, the access controller 16 decides the back off time. Here, the back off time is expressed by the integral multiple of a specified slot time. Therefore, the access controller 16 decides the number of slots of the back off. The number of slots of the back off is determined using a random number, as described above. In the explanation below, the number of slots of the back off is described as Nslot.

In step S5, the access controller 16 waits until the DIFS time has passed. Meanwhile, the DIFS is not limited to DIFS of IEEE802.11.

In steps S6-S7, the access controller 16 waits for one slot time while continuing carrier sense. Then, the access controller 16 decrements the variable Nslot representing the number of remaining slots by one. That is, Nslot=Nslot−1 is calculated.

In step S8, the access controller 16 decides whether or not the number of remaining slots Nslot is zero. When the number of remaining slots Nslot is not zero (that is, when the back off period has not ended). the access controller 16 decides whether or not the resource of the wireless network is in the busy state in step S9. When the resource of the wireless network is not in the busy state, the process of the access controller 16 returns to step S6. That is, when the wireless resource is in the idle state, steps S6-S9 are executed repeatedly until the number of remaining slots Nslot becomes zero. When the number of remaining slots Nslot becomes zero, the process of the access controller 16 moves to step S12. However, when the busy state is detected while executing steps S6-S9 repeatedly (step S9: Yes), the access controller 16 waits until the wireless resource enters the idle state in step S10.

When it is determined that the wireless resource is not in the busy state in step S2, the access controller 16 executes step S11. In step S11, the access controller 16 decides whether or not the idle time is longer than DIFS. When the idle time is equal to or less than DIFS, the process of the access controller 16 moves to step S4. On the other hand, when the idle time is longer than DIFS, the process of the access controller 16 moves to step S12.

In step S12, the access controller 16 obtains the transmission right in the wireless network. That is, when the wireless resource is in the idle state at the time when the corresponding back off time has passed, the access controller 16 obtains the right to transmit the packet while occupying the wireless resource (that is, the transmission right).

In step S13, TXOP is calculated. Here, the calculation of TXOP is executed by the TXOP calculator 15. Therefore, the access controller 16 makes a request to the TXOP calculator 15 for calculating TXOP in step S13, and receives the calculation result of TXOP.

In step S14, the access controller 16 reads out a packet from the transmission buffer 13 and transmits the packet. At this time, the access controller 16 is able to transmit the packets stored in the transmission buffer 13 until the TXOP period calculated in step S13 has passed Note that the flowchart illustrated in FIG. 7 does not describe all the processes executed by the access controller 16. That is, the access controller 16 may execute other processes that are not illustrated in FIG. 7.

Figure 8:
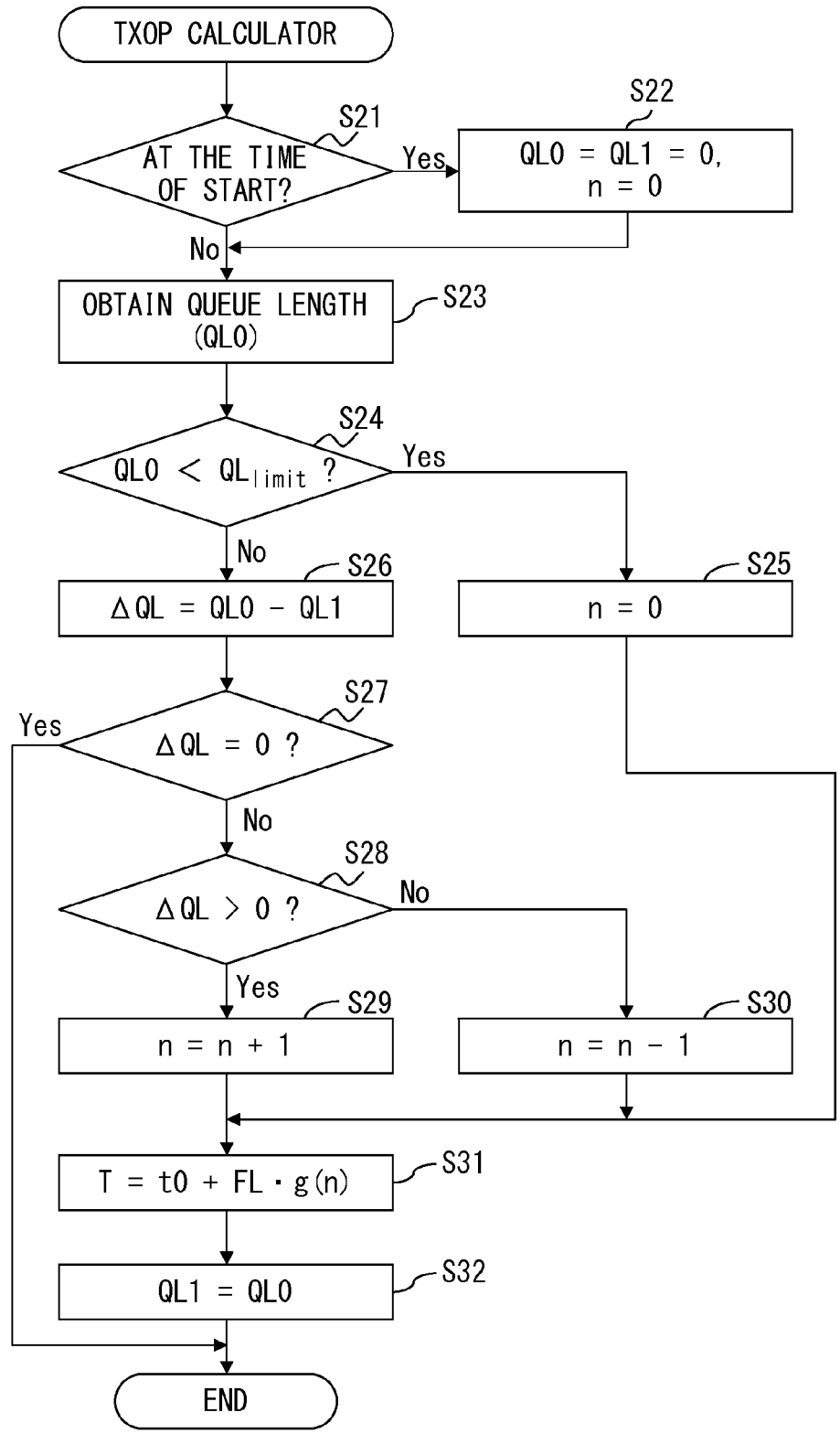
FIG. 8 is a flowchart illustrating the process of a TXOP calculator.

FIG. 8 is a flowchart illustrating the process of the TXOP calculator 15. This process is called up by the access controller 16 in step S13 illustrated in FIG. 7.

In step S21, the TXOP calculator 15 decides whether or not it is immediately after the node equipment 1 is started or activated. When it is immediately after the node equipment 1 is started, in step S22, the TXOP calculator 15 initializes a variable QL0, a variable QL1, and a variable n to zero, respectively. The variable QL0 represents the current transmission queue length of the transmission buffer 13. The variable QL1 represents the transmission queue length of the transmission buffer 13 detected in the last transmission cycle. The variable n represents the number of execution of the process to increase TXOP.

In step S23, the TXOP calculator 15 obtains the current transmission queue length of the transmission buffer 13. The transmission queue length is detected by the transmission queue length detector 14. That is, the TXOP calculator 15 receives information representing the transmission queue length from the transmission queue length detector 14. Then, the TXOP calculator 15 holds the obtained transmission queue length as QL0.

In step S24, the TXOP calculator 15 compares the current transmission queue length QL0 and a specified threshold queue length $QL_{Limit}$. When the transmission queue length QL0 is shorter than the threshold queue length $QL_{Limit}$, the TXOP calculator 15 decides that no congestion has occurred. In this case, the TXOP calculator 15 updates the variable n to zero in step S25. On the other hand, when the current transmission queue length QL0 is equal to or longer than the threshold queue length $QL_{Limit}$, the TXOP calculator 15 decides that congestion has occurred. In this case, the process of the TXOP calculator 15 moves to step S26.

In steps S26-S28, the TXOP calculator 15 calculates a difference ΔQL between the transmission queue length QL1 of the transmission buffer 13 in the last transmission cycle, and the current transmission queue length QL0. That is, the TXOP calculator 15 calculates ΔQL=QL0−QL1.

"ΔQL=0" represents a situation in which the transmission queue length of the transmission buffer 13 does not change in the period from the last transmission cycle to the current transmission cycle. That is, when the difference ΔQL is zero (step S27: Yes), the TXOP calculator 15 decides that the congestion level has not changed and the process of the TXOP calculator 15 is terminated. That is, when the transmission queue length has not changed, the TXOP calculator 15 maintains TXOP. In this case, the access controller 16 transmits a packet with the same TXOP as that in the last transmission cycle.

"ΔQL>0" represents a situation in which the transmission queue length becomes longer in the period from the last transmission cycle to the current transmission cycle. That is, when ΔQL is a positive value (step S28: Yes), the TXOP calculator 15 decides that the congestion level has deteriorated. In this case, the TXOP calculator 15 adds "1" to the variable n in step S29.

"ΔQL>0" represents a situation in which the transmission queue length becomes shorter in the period from the last transmission cycle to the current transmission cycle. That is, when ΔQL is a negative value (step S28: No), the TXOP calculator 15 decides that the congestion level has improved although it is still congested. In this case, the TXOP calculator 15 subtracts "1" from the variable n in step S30.

In step S31, the TXOP calculator 13 calculates TXOP based on the variable n. In this example, TXOP is calculated by the following formula.

$$TXOP = t0 + FL \times g(n)$$

In the above formula, t0 represents the initial value of TXOP. As the initial value of TXOP, for example, a time required for transmitting one packet is set. However, the initial value of TXOP may also be a longer time. In addition, the initial value of TXOP may also be zero. FL represents a time corresponding to the frame length of the transmission packet. In this example, it is assumed that the frame length of the packet is fixed. In addition, the frame length may also include IFS (for example, DIFS described above, or SIFS described later). g(n) is a positive value determined by the variable n, which is given by the following formula, for example:

$$g(n) = B \times n$$

B is a positive integer specified in advance.

In step S32, the TXOP calculator 15 saves the transmission queue length QL0 obtained in step S23 as the transmission queue length QL1 used in the next transmission cycle. As described above, when the access controller 16 obtains the transmission right, the TXOP calculator 15 calculates TXOP.

Meanwhile, when no congestion has occurred (that is, when the current transmission queue length QL0 is shorter than the threshold queue length $QL_{Limit}$), in step S25, zero is set as the variable n. In this case, in step S31, g(0) becomes zero, and "t0" is obtained as TXOP.

As described above, when the congestion condition deteriorates (ΔQL>0), in step S29, the variable n is incremented. In this case, compared with the previous transmission cycle, TXOP becomes longer. Then, the node equipment 1 is able to transmit packets stored in the transmission buffer 13 using the wireless resource exclusively for a longer time. Therefore, congestion of the node equipment 1 will be suppressed.

On the other hand, when the congestion condition is getting better (ΔQL<0), in step S30, the variable n is decremented. In this case, compared with the last transmission cycle, TXOP becomes shorter. That is, the period in which the node equipment 1 exclusively uses the wireless resource becomes shorter. Therefore, a part of the wireless resource that the node equipment 1 had occupied will be assigned to other node equipments. As a result, in the wireless network as a whole, the wireless resources are used efficiently.

Figure 9:
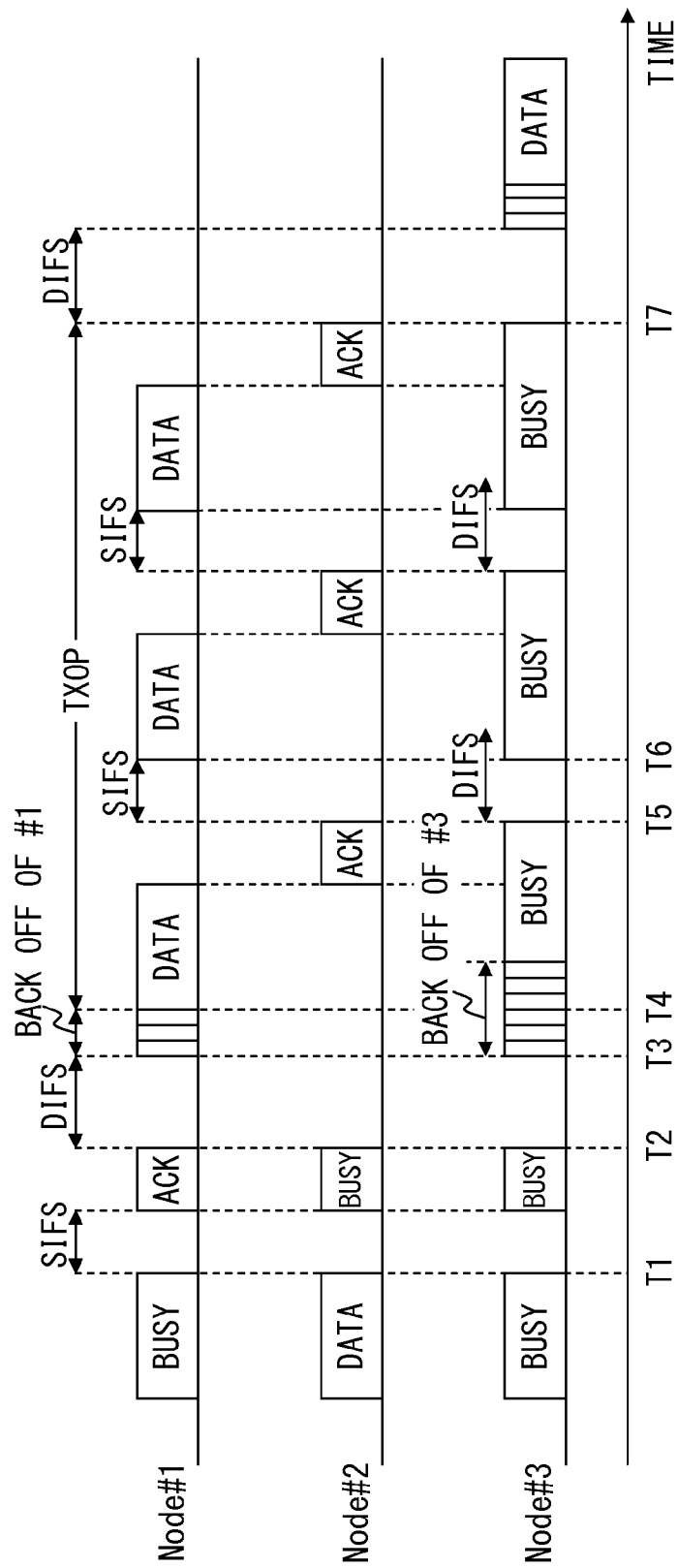
FIG. 9 illustrates an example of the packet transmission sequence in a wireless network including a node equipment according to the embodiment.

FIG. 9 illustrates an example of a packet transmission sequence in a wireless network including the node equipment of the embodiment. In this example, it is assumed that the wireless network includes three node equipments #1-#3. In addition, it is assumed that, before time T1, transmission of data packet from the node equipment #2 to the node equipment #1 is performed. That is, before time T1, the node equipments #1, #3 respectively detect the busy state by carrier sense.

When the data packet transmission from the node equipment #2 to the node equipment #1 ends at the time T1, the node equipment #1 waits for a specified period of time that is shorter than the DIFS described above. This specified period of time corresponds to, for example, while there is no particular limitation, SIFS: Short Inter Frame Space defined in IEEE802.11. Therefore, in the description below, this period of time is referred to as SIFS. However, this period of time is not limited to SIFS of IEEE802.11.

When the SIFS has passed from the time T1, the node equipment #1 sends back an ACK packet to the node equipment #2. In the period of time in which the ACK packet is transmitted, the node equipments #2, #3 respectively detect the busy state by carrier sense.

When the ACK packet transmission from the node equipment #1 to the node equipment #2 ends at time T2, each node equipment waits for the DIFS. Then, at time T3 when the DIFS has passed from time T2, each node equipment (except the transmission source node equipment of the immediately preceding data packet transmission) decides the back off time. In this example, the back off time of the node equipments #1, #3 is decides as three slot times and six slot times, respectively.

The node equipments #1, #3 respectively count the corresponding back off time from time T3. This process corresponds to steps S6-S9 illustrated in FIG. 7. Here, the back off time of the node equipment #1 is shorter than the back off time of the node equipment #3. Therefore, it is the node equipment #1 whose back off time ends first after time T3. That is, the back off time of the node equipment #1 ends at time T4 when the three slot times have passed from time T3. At that time, the node equipment #1 obtains the transmission right. This process corresponds to step S12 illustrated in FIG. 7. Then, the TXOP calculator 15 of the node equipment #1 calculates the TXOP by executing the process of the flowchart illustrated in FIG. 8.

The node equipment #1 is able to transmit packets stored in the transmission buffer 13 until the TXOP has passed from time T4. In the example illustrated in FIG. 9, the node equipment #1 transmits three data packets to the node equipment #2 during TXOP.

At this time, when the node equipment #1 transmits a data packet to the node equipment #2, the node equipment #2 sends back an ACK packet to the node equipment #1. Then, at time T5, the transmission of the ACK packet ends. Note that, while the ACK packet is sent back immediately after the end of the data packet transmission in the example illustrated in FIG. 9, the ACK packet may be sent back when the SIFS has passed from the end of the data packet transmission.

Each node equipment (in this example, the node equipment #3) waits for DIFS from the point of time when the transmission of the ACK packet ends. That is, the node equipment #3 is not able to obtain the transmission right in the period from the time when the transmission of the ACK packet ends until the DIFS has passed.

Meanwhile, the node equipment (in this example, the node equipment #1) that holds the transmission right is able to transmit the next packet when the SIFS has passed from the end of the ACK packet transmission. Therefore, the node equipment #1 sends the next data packet when the SIFS has passed from time T5.

Here, the SIFS is shorter than the DIFS. For this reason, before the node equipment #3 obtains the transmission right, the node equipment #1 starts the transmission of the data packet at the time T6. Then, the node equipment #3 is not able to obtain the transmission right until the data packet transmission ends.

As described above, the node equipment #1 is able to transmit the next data packet after transmitting a data packet, without another node equipment obtaining the transmission right. Therefore, by repeating the procedure described above, the node equipment #1 is able to transmit a plurality of data packets consecutively during the period of TXOP.

When TXOP of the node equipment #1 ends at time T7 and the DIFS has passed, another node equipment (in this example, the node equipment #3) is able to obtain the transmission right. Here, the back off of the node equipment #3 is reduced from six slot times to three slot times during time T3-T4. However, at time T4 (that is, the time when the node equipment #1 starts packet transmission), three slot times remain as the back off of the node equipment #3. Therefore, the node equipment #3 is able to obtain the transmission right after the DIFS plus three slot times have passed from time T7.

As described above, in the wireless network including the node equipment of the embodiment, the node equipment that has obtained the transmission right is able to transmit a plurality of packets during the TXOP. Therefore, when the TXOP of the node equipment is made longer, the node equipment is able to transmit more packet in one transmission opportunity. As a result, the congestion of the node equipment is resolved or suppressed.

Figure 10:
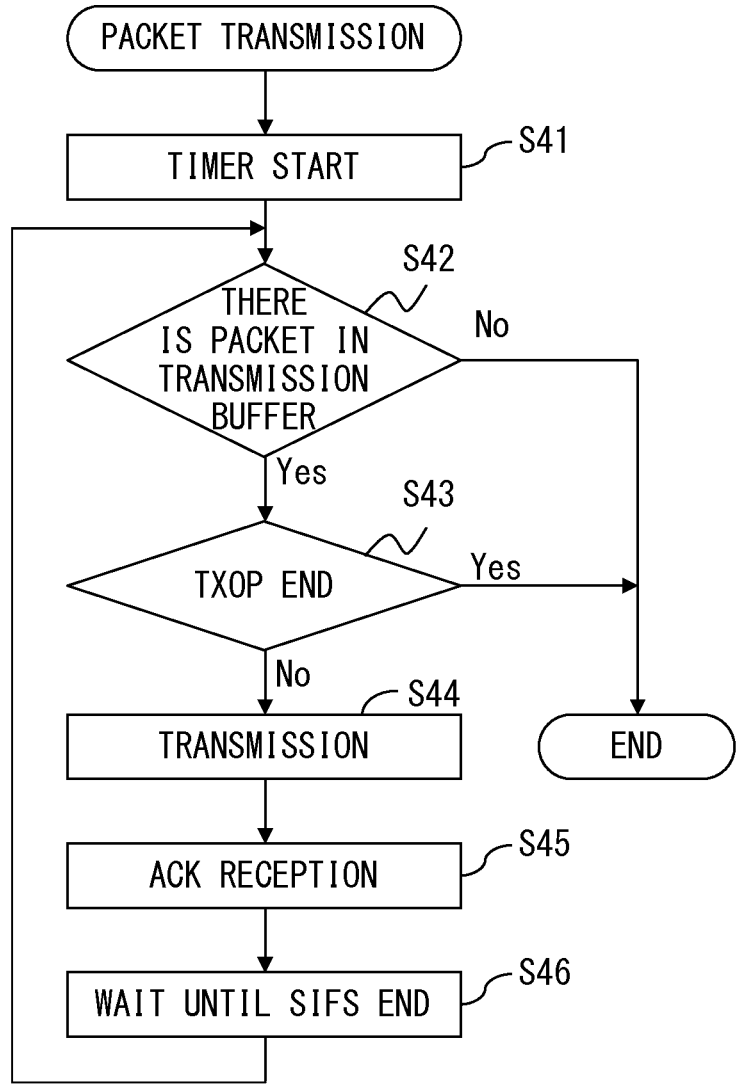
FIG. 10 is a flowchart illustrating a packet transmission process.

FIG. 10 is a flowchart illustrating the packet transmission process. This process corresponds to step S14 in FIG. 7. That is, the process of the flowchart illustrated in FIG. 10 is, for example, executed by the access controller 16 of the node equipment that has obtained the transmission right.

In step S41, the access controller 16 starts the timer for counting the TXOP. That is, the access controller 16 counts the TXOP from when the transmission right is obtained.

In step S42, the access controller 16 decides whether or not any packet is stored in the transmission buffer 13. Then, when any packet is stored in the transmission buffer 13, the access controller 16 decides whether or not the TXOP has ended in step S43.

When the TXOP has not ended, the access controller 16 reads out a packet from the transmission buffer 13 and transmits the packet in step S44. Next, the access controller 16 waits for a period of the SIFS in step S46. Then the process of the access controller 16 returns to step S42. After that, the access controller 16 repeatedly executes the process in steps S42-S46.

However, when the TXOP ends (step S43: Yes), the process of the access controller 16 also ends. In other words, the access controller 16 is able to transmit the packets stored in the transmission buffer 13 continuously from when the transmission right is obtained until the TXOP ends.

Meanwhile, when the packet stored in the transmission buffer 13 are all read out (step S42: No), the process of the access controller 16 may be finished before the TXOP ends. By adopting this sequence, since the wireless resource is released before the TXOP ends, the efficiency of the wireless resource becomes higher in the wireless network as a whole.

Figure 11A:
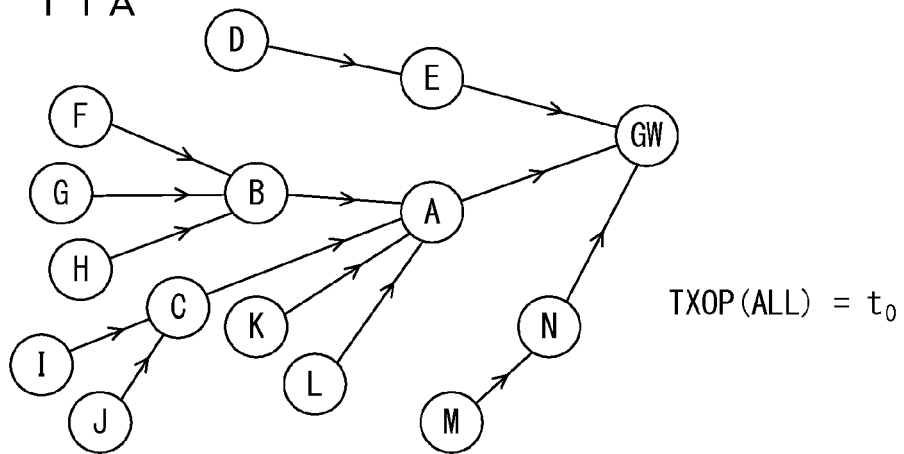

FIG. 11A-FIG. C, FIG. 12A-FIG. 12C, FIG. 13A, FIG. 13B illustrate an example of a congestion control method of the embodiment. Here, as illustrated in FIG. 11A, it is assumed that the wireless network includes nodes A-N, and GW. In the nodes A-N, and GW, node equipments A-N, and G are implemented, respectively. In addition, it is assumed that, in the similar manner as in the wireless network explained with reference to FIG. 2A-FIG. 2C, the node equipments A-N respectively generate one data packet and transmit the packet to the node GW in each transmission cycle. Here, the frame length of the data packets generated by the respective node equipments are assumed to be the same. The packet transmitted from each node is forwarded to the node GW in the multi-hop scheme via the wireless link illustrated in FIG. 11A.

In FIG. 11A, it is assumed that TXOP=t0 is set respectively in the node equipments A-N. In this case, t0 is assumed to correspond to a period of time required for transmitting a specified number of data packets. That is, the respective node equipments A-N are able to transmit one or more data packets upon obtaining the transmission right.

Some of the node equipments in the wireless network described above relay the packet transmitted from one or a plurality of other nodes. For example, the node equipment E forwards the packet transmitted from the node D to the node GW. Similarly, the node equipment A forwards the packets transmitted respectively from the nodes B, C, K, L to the node GW. At this time, in the node equipment that relays packets transmitted from many nodes, congestion occurs easily. In the wireless network illustrated in FIG. 11A, the node equipment A relays packets transmitted from four nodes, the node equipment B relays packets transmitted from three nodes, and the node equipment C relays packets transmitted from two nodes.

In this example, first, congestion occurs in the node equipment A. That is, the TXOP calculator 15 of the node equipment A detects that the transmission queue length of the transmission buffer 13 of the node equipment A is longer than the threshold. This detection corresponds to step S24 in FIG. 8. By so doing, the TXOP calculator 15 changes the TXOP from "t0" to "t0+FL×g(1)". As described above, g(1) is expressed by "B×n". Here, B=1 is assumed to simplify the explanation. Then, the TXOP of the node equipment A is set to "t0+FL". Meanwhile, "TXOP ( )" in FIG. 11A-FIG. 11C, FIG. 12A-FIG. 12C, FIG. 13A, FIG. 13B represents the TXOP of the node equipment in the parenthesis. For example, "TXOP (A)" represents the TXOP of the node equipment A.

Figure 11B:
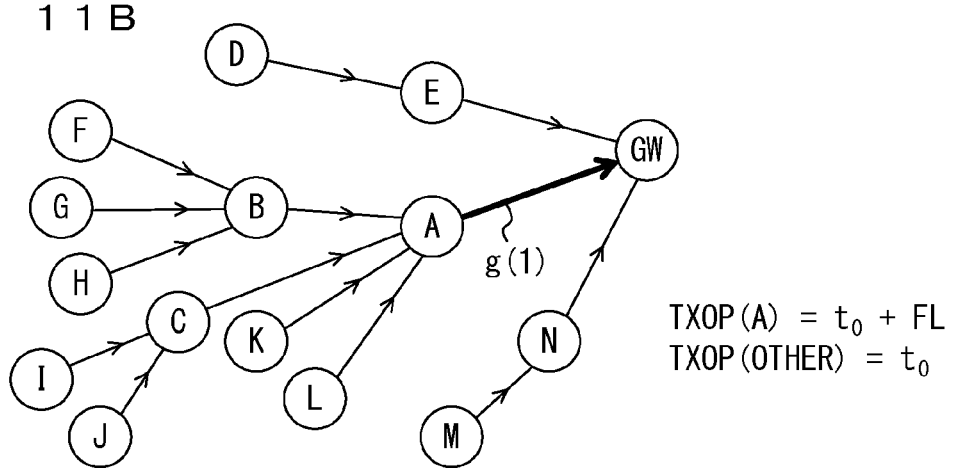

FIG. 11B represents the situation in which the TXOP of the node equipment A is extended from "t0" to "t0+FL". In this case, the node equipment A is able to transmit packets while occupying the wireless resource over a longer period of time than in the normal condition.

Figure 11C:
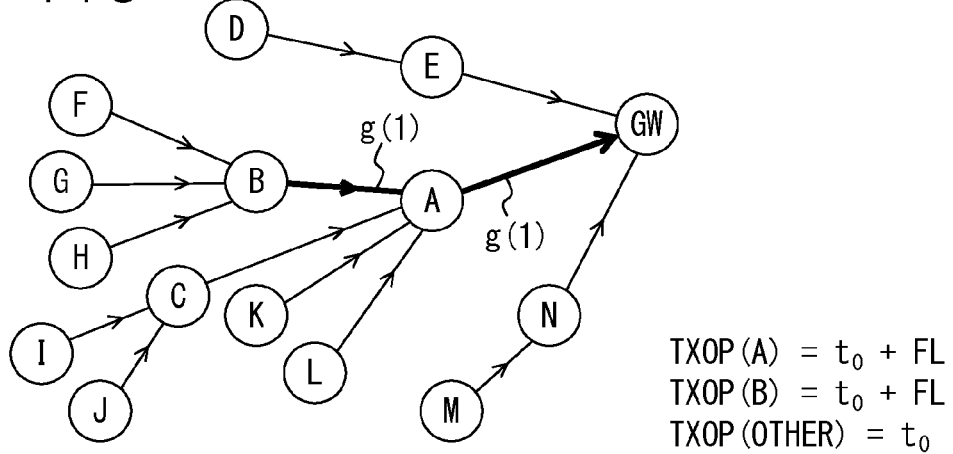

When the TXOP of the node equipment A becomes longer, it becomes difficult for other node equipments (for example, the node equipments around the node equipment A) to obtain the transmission right. As a result, in this example, the node equipment B is unable to obtain sufficient transmission opportunity, and congestion occurs in the node equipment B. That is, the TXOP calculator 15 of the node equipment B detects that the transmission queue length of the node equipment B is longer than the threshold. By so doing, the TXOP calculator 15 of the node equipment B changes the TXOP from "t0" to "t0+FL", in the same manner as in the node equipment A. That is, as illustrated in FIG. 11C, the TXOP of the node equipment B is also changed to "t0+FL".

When the TXOP of the node equipment B becomes longer, the number of packets that the node equipment B transmits in one transmission cycle increases. As a result, the node equipment A receives more packets, and the congestion condition of the node equipment A gets worse. That is, the transmission queue length of the node equipment A becomes further longer.

Figure 12A:
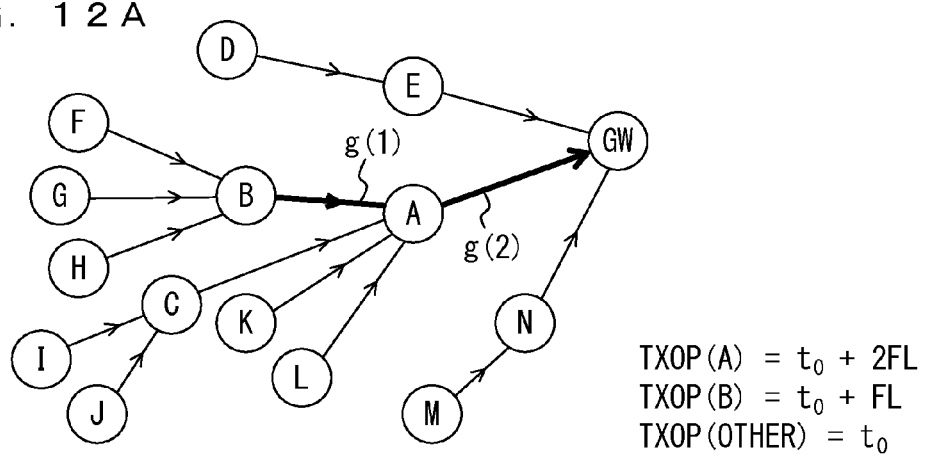

In this case, in the node equipment A, the difference $\Delta QL$ of the transmission queue length calculated in step S26 in FIG. 8 becomes a positive value. Therefore, the TXOP calculator 15 of the node equipment A increments the variable n in step S29, and after that, extends the TXOP from "t0+FL" to "t0+2FL" in step S31. That is, as illustrated in FIG. 12A, the TXOP of the node equipment A is set to "t0+2FL", and the TXOP of the node equipment B is set to "t0+FL".

Figure 12B:
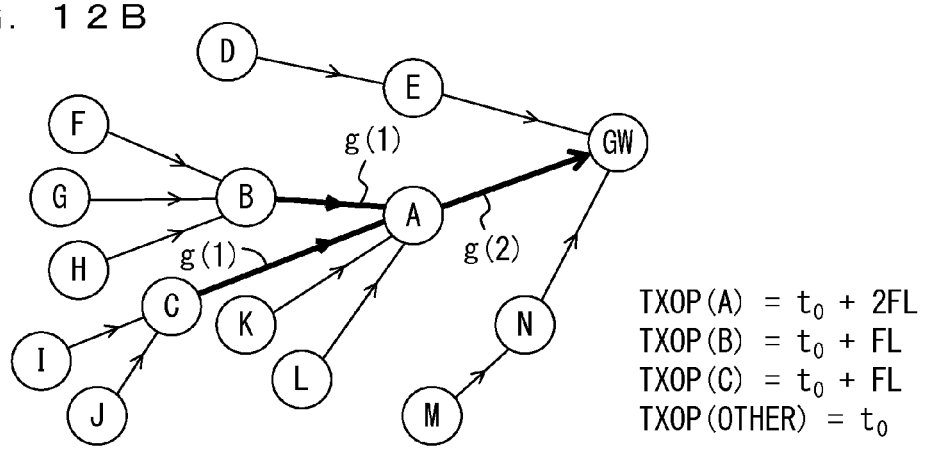

Next, congestion occurs in the node equipment C as well. Upon detecting the congestion, the node equipment C changes the TXOP from "t0" to "t0+FL", in the same manner as the node equipment B. Therefore, as illustrated in FIG. 12B, the TXOP of the node equipments A, B, C are set to "t0+2FL", "t0+FL", "t0+FL", respectively.

Figure 12C:
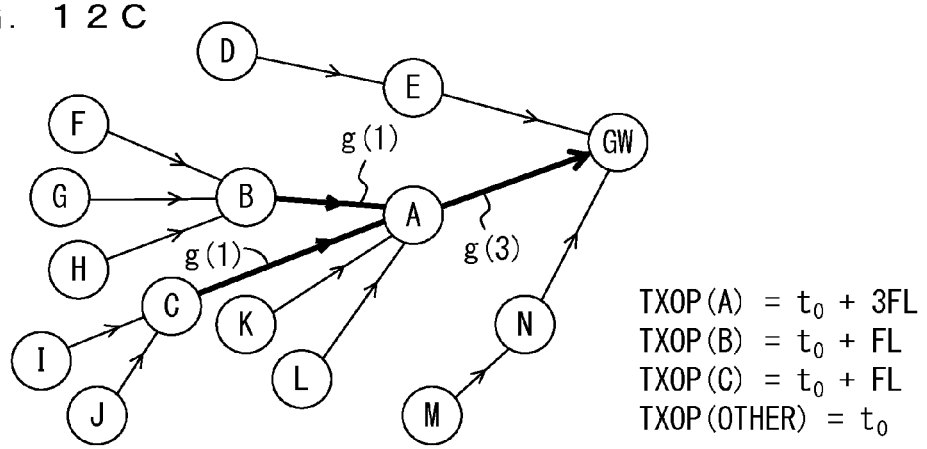

When the TXOP of the node equipments B, C become longer, the number of packets that the node equipments B, C transmit in one transmission cycle increases. Then, the congestion condition of the node equipment A gets worse furthermore. That is, the transmission queue length of the node equipment A becomes further longer. Therefore, the TXOP calculator 15 of the node equipment A extends the TXOP from "t0+2FL" to "t0+3FL". Then, as illustrated in FIG. 12C, the TXOP of the node equipments A, B, C are set to "t0+3FL", "t0+FL", "t0+FL", respectively.

When the TXOP of the node equipments A, B, C are respectively extended, it becomes more difficult for other node equipments (for example, node equipments around the node equipments A, B, C) to obtain the transmission right. For this reason, the number of packets transmitted from nodes other than the nodes A, B, C gradually decreases. It is assumed that, as a result, congestion is resolved in the node equipments B, C. In addition, it is assumed that, in the node equipment A, the congestion condition continues, but the congestion level decreases.

In this case, the transmission queue length of the node equipments B, C respectively becomes shorter than the threshold. Then, the TXOP calculator 15 of the node equipment B updates the variable n to zero in step S25 in FIG. 8. As a result, the TXOP of the node equipment B is shortened from "t0+FL" to the initial value "t0". In a similar manner, the TXOP is shortened to "t0" in the node equipment C as well.

In the node equipment A, the transmission queue length is still longer than the threshold, thus it is decided to be "No" in step S24 in FIG. 8. However, the transmission queue length has become shorter than the transmission queue length in the previous transmission cycle. That is, it is decided to be "No" in step S28 of FIG. 8 and the variable n is decremented in step S30. Therefore, the TXOP of the node equipment A is shortened in step S21 from "t0+3FL" to "t0+2FL". Accordingly, as illustrated in FIG. 13A, the TXOP of the node equipments A, B, C are set to "t0+2FL", "t0", "t0", respectively.

It is assumed that, after that, the number of packets transmitted from nodes B, C decreases, and congestion in the node equipment A is resolved. That is, the transmission queue length of the node equipment A becomes shorter than the threshold. Then, the TXOP calculator 15 of the node equipment A updates the variable n to zero in step S25 of FIG. 8. As a result, the TXOP of the node equipment A is shortened from "t0+2FL" to "t0" as illustrated in FIG. 13B.

As described above, in the congestion control method of the embodiment, each of the node equipments autonomously adjusts the TXOP according to the congestion condition. By this autonomous distributed control, the wireless resource of the wireless network is appropriately allocated to a plurality of node equipments so as to avoid or suppress congestion. Therefore, the following effects are obtained.

(1) Even when the packet paths concentrates temporarily and/or locally due to path switching caused by instability of the wireless link and the like or due to node layout, the congestion is resolved or suppressed in a short period of time.

(2) Since there is no need to assign an excessive bandwidth to the wireless link between the respective nodes, the wireless resource can be used efficiently.

(3) Since a message for sending notification of the congestion condition or a message for making a request for changing the transmission rate is not required, the congestion is not worsened due to the message.

(4) It is possible to perform congestion control even when the respective node equipments do not recognize the network topology.

Therefore, even when the node in which congestion occurs changes due to a change in the network topology and the like, the congestion is suppressed in short period of time. For example, in FIG. 2B, the node A is the most susceptible to the occurrence of congestion, but in FIG. 2C, the node B is the most susceptible to the occurrence of congestion. In this case, when the network topology changes from the configuration illustrated in FIG. 2B to the configuration illustrated in FIG. 2C, for example, the node equipment A autonomously shortens the TXOP, and the node equipment B autonomously extends the TXOP. As a result, congestion is suppressed without decreasing the efficiency of the wireless resource.

Meanwhile, in the congestion control method of the embodiment, as described above, the TXOP of the node equipment in the congestion condition is extended. For this reason, the transmission rate or the transmission bandwidth of the node equipment temporarily increases. However, when the TXOP of a node equipment becomes longer, it becomes difficult for node equipments in its surrounding to obtain the transmission right. That is, the transmission rate or the transmission bandwidth of the node equipments in the surrounding practically decreases. Therefore, in the wireless network as a whole, the transmission bandwidth does not exceed the capacity specified in advance.

<Another Embodiment>

In the embodiment described above, the respective node equipments are able to obtain the transmission right after the DIFS has passed since the busy state ends. However, the present invention is not limited to this access method. That is, for example, the configuration may also be made so that the congested node equipment is able to obtain the transmission right with a shorter waiting time than other node equipments. According to this method, it becomes possible to ease congestion more promptly.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A congestion control method used in a wireless network that includes a plurality of wireless communication equipments, the method comprising:
    monitoring a congestion condition in respective wireless communication equipments; and
    extending an exclusive transmission time in which a packet is transmitted exclusively using wireless resource of the wireless network in a congested wireless communication equipment in which congestion has occurred among the plurality of wireless communication equipments, wherein
    in the congestion wireless communication equipment, when the queue length of the transmission buffer increases, the exclusive transmission time is further extended, and wherein
    the exclusive transmission time is calculated by $t0+B \times n \times FL$,
    $t0$ is a specified initial period of time,
    $B$ is a specified positive integer,
    $n$ is a variable that indicates a number of times of extension of the exclusive transmission time, and
    $FL$ is a period of time required for transmitting the packet.

2. The congestion control method according to claim 1, wherein
    the monitoring of the congestion condition includes a process to compare a queue length of a transmission buffer configured to store a transmission packet with a specified threshold.

3. The congestion control method according to claim 2, wherein
    in the congestion wireless communication equipment, when the queue length of the transmission buffer decreases, the exclusive transmission time is shortened.

4. The congestion control method according to claim 2, wherein
    in the congestion wireless communication equipment, when the queue length of the transmission buffer does not change, the exclusive transmission time is maintained.

5. The congestion control method according to claim 1, wherein
    CSMA/CA (carrier sense multiple access with collision avoidance) is adopted in the wireless network,
    a transmission right is not granted to the plurality of wireless communication equipments from when a busy state of the wireless network ends until when a first period of time is passed, and
    during a period of time from when the congested wireless communication equipment obtains the transmission right until when the exclusive transmission is passed, the congested wireless communication equipment transmits a packet at a point of time when a second period of time that is shorter than the first period of time is passed after a busy state of the wireless network ends.

6. A congestion control method used by a wireless communication equipment in a wireless network that includes a plurality of wireless communication equipments, the method comprising:
    monitoring a congestion condition of the wireless communication equipment based on a queue length of a transmission buffer that stores a transmission packet; and
    extending an exclusive transmission time in which a packet is transmitted exclusively using wireless resource of the wireless network when congestion has occurred in the wireless communication equipment; wherein
    when the queue length of the transmission buffer increases, the exclusive transmission time is further extended, and wherein
    the exclusive transmission time is calculated by $t0+B \times n \times FL$,
    $t0$ is a specified initial period of time,
    $B$ is a specified positive integer,
    $n$ is a variable that indicates a number of times of extension of the exclusive transmission time, and
    $FL$ is a period of time required for transmitting the packet.

7. A wireless communication equipment used in a wireless network that includes a plurality of wireless communication equipments, the wireless communication equipment comprising:

a transmission buffer configured to store a packet;

a congestion condition monitor configured to monitor a congestion condition of the wireless communication equipment;

a calculator configured to calculate an exclusive transmission time in which the wireless communication equipment is able to transmit a packet exclusively using wireless resource of the wireless network based on the congestion condition monitored by the congestion condition monitor; and a transmitter configured to transmit a packet stored in the transmission buffer during a period of time from when the wireless communication equipment obtains a transmission right until when the exclusive transmission time is passed, wherein the calculator extends the exclusive transmission time, when the queue length of the transmission buffer increases, and wherein the calculator calculates the exclusive transmission time by $t0+B \times n \times FL$;

$t0$ is a specified initial period of time,

B is a specified positive integer, n is a variable that indicates a number of times of extension of the exclusive transmission time, and FL is a period of time required for transmitting the packet.

8. The wireless communication equipment according to claim 7, wherein the congestion condition monitor monitors the congestion condition by comparing a queue length of the transmission buffer with a specified threshold.

9. The wireless communication equipment according to claim 8, wherein the calculator shortens the exclusive transmission time, when the queue length of the transmission buffer decreases.

10. The wireless communication equipment according to claim 8, wherein the calculator maintains the exclusive transmission time, when the queue length of the transmission buffer does not change.

11. The wireless communication equipment according to claim 7, wherein

CSMA/CA (carrier sense multiple access with collision avoidance) is adopted in the wireless network, a transmission right is not granted to the plurality of wireless communication equipments from when a busy state of the wireless network ends until when a first period of time is passed, and during a period of time from when the wireless communication equipment obtains the transmission right until when the exclusive transmission is passed, the wireless communication equipment transmits a packet at a point of time when a second period of time that is shorter than the first period of time is passed after a busy state of the wireless network ends.

* * * * *